United States Patent [19]

Noda

[11] Patent Number: 5,438,465
[45] Date of Patent: Aug. 1, 1995

[54] RECORDING/REPRODUCING APPARATUS FOR A DISC

[75] Inventor: Masayuki Noda, Kanagawa, Japan

[73] Assignee: Sony Corporation, Tokyo, Japan

[21] Appl. No.: 84,754

[22] Filed: Jun. 30, 1993

Related U.S. Application Data

[63] Continuation of Ser. No. 601,350, Oct. 23, 1990, abandoned.

[30] Foreign Application Priority Data

Oct. 24, 1989 [JP] Japan .................... 1-276796

[51] Int. Cl.⁶ .................. G11B 21/02; G11B 5/55; G11B 5/56
[52] U.S. Cl. ..................... 360/75; 360/106; 360/109
[58] Field of Search ............. 360/105, 133, 128, 106, 360/107, 109, 99.02, 99.06, 75

[56] References Cited

U.S. PATENT DOCUMENTS

| | | | |
|---|---|---|---|
| 4,573,572 | 3/1986 | Kato et al. | 360/133 |
| 4,736,263 | 4/1988 | Takahashi et al. | 360/75 |
| 4,747,003 | 5/1988 | Tezuka | 360/106 |
| 4,841,397 | 6/1989 | Maeda | 360/105 |
| 4,843,502 | 6/1989 | Tagawa | 360/105 |
| 4,847,713 | 7/1989 | Fujiwara | 360/99.06 |
| 5,055,949 | 10/1991 | Kawakami | 360/75 |

Primary Examiner—Aristotelis Psitos
Assistant Examiner—Varsha A. Kapadia
Attorney, Agent, or Firm—Jay H. Maioli

[57] ABSTRACT

A recording/reproducing apparatus for a disc accommodates a magnetic disc in a disc cartridge. The disc may be loaded on a disc table of a disc rotating-driving device by the operation of introducing the disc cartridge into a cartridge holder which is supported for vertical movement along the rotational axis of the disc rotating-driving device. The magnetic head is brought into contact with the magnetic disc after loading the magnetic disc on the disc table and rotationally driving the disc rotating-driving device. Since the magnetic head is contacted with the magnetic disc after loading the disc on the disc table and setting the disc into rotation, the magnetic head and the magnetic disc may be contacted with each other after removal of dust and dirt occasionally affixed on the disc surface.

5 Claims, 10 Drawing Sheets

RECORDING/REPRODUCING APPARATUS FOR A DISC

This is a continuation of application Ser. No. 07/601,350, filed Oct. 23, 1990 now abandoned.

BACKGROUND OF THE INVENTION

1. Field of the Invention

This invention relates to a disc driving apparatus for rotationally driving a sheet-like magnetic disc for recording and/or reproducing information signals on or from the magnetic disc. More particularly, it relates to a disc driving apparatus in which, for protecting the magnetic disc, the contact between the magnetic head and the magnetic disc is controlled in connection with the operation of loading the disc cartridge accommodating the magnetic disc.

2. Brief Description of the Related Art

Up to now, as a recording medium for recording information signals, such as data signals, a magnetic disc comprising of a base member in the form of a disc-shaped thin film sheet, and a magnetic layer deposited thereon as a signal recording layer, has been used extensively. This type of magnetic disc, however, may be damaged easily during handling since the brittle thin film sheet is used as the base member. In addition, the slightest injury to the magnetic layer results in signal dropout because of the elevated recording density of the magnetic disc.

For this reason, this type of the magnetic disc is accommodated in main cartridge body and loaded in this state into the recording/reproducing apparatus.

The disc cartridge comprising the magnetic disc accommodated in the main cartridge body is shown for example in FIGS. 1 and 2.

The disc cartridge 1 comprises a main cartridge body 2 consisting of an upper half 2a and a lower half 2b, each in the form of a rectangular flat plate, abutted and connected to each other, and a sheet-like magnetic disc 3 in the form of a disc which is rotatably accommodated in the main cartridge body 2. A central disc-shaped member 4 formed by a metal plate and operating as a mounting means to a disc table of a disc driving device of a magnetic recording and/or reproducing apparatus into which the disc cartridge is loaded, is provided at the center of the magnetic disc 3 accommodated in the main cartridge body 2. Referring to FIG. 2, the central disc-shaped member 4 has a central opening 5 engaged by a central driving shaft of the disc table, and a rectangular opening 6, at a position offset from the center of the member 4, engaged by a driving pin of the disc table. When the disc 3 is received within the main cartridge body 2, the disc-shaped member 4 is loosely fitted in a disc table inserting opening or aperture 7 formed at the center of the lower half 2b of the main cartridge body 2 so as to be exposed to the outside of the main cartridge body 2. In the upper and lower halves 2a, 2b of the main cartridge body 2 are formed head inserting openings 8a, 8b by which the signal recording surface of the magnetic disc 3 is exposed to the outside along the disc radius and by means of which the magnetic head of the recording/reproducing apparatus is inserted into the disc cartridge. These head inserting openings 8a, 8b may be closed and opened by a shutter 9 slidably mounted on the main cartridge body 2. This shutter 9 is formed by bending a thin metal plate into a sectional shape of a letter U and is slidably mounted on the upper and lower major surfaces of the main cartridge body 2 from the front side of the main cartridge body 2. The shutter 9 is also formed with openings 10, 10 which register with the head inserting openings 8a, 8b on sliding movement of the shutter 9 to open the head inserting openings 8a, 8b. The shutter 9 is usually biased by a spring, not shown, to a position of closing the head inserting openings 8a, 8b in which the openings 10 do not register with the head inserting openings 8a, 8b.

The recording/reproducing apparatus for a disc employing this type of the disc cartridge 1 as the recording medium is disclosed in, for example, U.S. Pat. No. 4,750,065.

The disc drive device disclosed in the U.S. Patent includes a disc table on which is loaded magnetic disc 3 accommodated in the disc cartridge 1, a disc rotating-driving device for rotationally driving the magnetic disc 3 by rotation of the disc table and a cartridge holder supported for vertical movement along the axis of rotation of the disc rotating-driving device and moved towards the disc table in association with the inserting operation of the disc cartridge 1. This cartridge holder is provided with a shutter opening and closing mechanism for opening and closing the shutter 9 depending upon the loading and unloading operation of the disc cartridge 1.

The recording and/or reproducing apparatus is also provided with a magnetic head device which is moved in association with the operation of insertion of the disc cartridge 1 into the cartridge holder for bringing the magnetic head into contact with the magnetic disc 3 via head insertion openings 8a, 8b of the disc cartridge 1. This magnetic head device is provided with a head shifting unit for shifting the magnetic head along the radius of the magnetic disc 3 with the magnetic head kept in contact with the disc 3.

With the above described recording and/or reproducing apparatus for a disc, when the disc cartridge 1 is inserted into the cartridge holder, the shutter 9 is moved by the shutter opening and closing mechanism provided in the cartridge holder to open the head inserting openings 8a, 8b. When the disc cartridge 1 is inserted and loaded in the cartridge holder, the cartridge holder is lowered towards the disc table of the disc rotating-driving device. The magnetic disc 3 within the disc cartridge 1 is loaded on the disc table by means of the central disc-shaped member 4. The magnetic head is also moved to follow the descent of the cartridge holder towards the disc table into contact with the magnetic disc loaded on the disc table. With the magnetic head in contact with the magnetic disc, the disc table is driven into rotation for recording/reproducing information signals on of from the magnetic disc by means of the magnetic head.

With the above described disc cartridge in which the magnetic disc 3 is accommodated in the main cartridge body 2 and the head inserting openings 8a, 8b in the main cartridge body 2 are closed by the shutter 9, it is possible to prevent the signal recording surface of the magnetic disc from being contaminated by inadvertent contact of the finger of hand with the magnetic disc during non-use time, such as during storage, of the magnetic disc.

However, with the above disc cartridge 1, since the central disc-shaped member 4 of the magnetic disc is loosely fitted in the disc table inserting aperture 7 formed in the lower half 2b so as to be exposed towards the exterior of the main cartridge body 2, a small gap is formed between the central disc-shaped member 4 and the disc table inserting aperture 7, such that minute dust and dirt are introduced into the inside of the main cartridge body 2 by way of this small gap. There is also the risk that dust and dirt may be introduced into the main cartridge body 2 by means of the head inserting openings 8a, 8b which are opened when the shutter 9 is actuated in association with the loading of unloading of the disc cartridge 1 into and out of the recording and/or reproducing apparatus.

When the dust and dirt are introduced into the inside of the main cartridge body 1 so as to be affixed on the signal recording surface of the disc 3, such dust and dirt are interposed between the magnetic head and the disc 3 when the magnetic head is contacted with the disc. Above all, with the above described conventional recording and/or reproducing apparatus for a disc, since the disc 3 is set into rotation after the disc 3 is loaded on the disc table and the magnetic head is contacted with the disc, there is the risk that the rotation of the magnetic disc be started with the dust and dirt interposed between the magnetic head and the disc 3.

When the magnetic disc is rotated with the dust and dirt interposed between the magnetic head and the magnetic disc 3, the disc or the head may be damaged easily by such dust and dirt. The result is that not only the satisfactory recording/reproducing characteristics cannot be maintained but the magnetic head and/or the magnetic disc may become unusable.

OBJECT AND SUMMARY OF THE INVENTION

It is therefore an object of the present invention to provide a disc driving apparatus in which, even when the dust and dirt are introduced into the main cartridge body and affixed to the disc, such dust and dirt are not interposed between the head and the disc when the magnetic head is contacted with the disc to provide for sufficient protection of the magnetic head and the disc.

The disc drive apparatus according to the present invention comprises a disc rotating-driving device including a disc table mounting a disc and adapted to be rotated for rotating the disc, a cartridge holder supported for vertical movement along the axis of rotation of the disc rotating-driving device and adapted to be moved towards the disc table in association with the inserting operation of the disc cartridge rotatably accommodating the disc cartridge therein, a magnetic head device supporting the magnetic head so that the head may be brought into or out of contact with the disc supported on the disc table, a rotation detection unit for detecting the rotation of the disc rotating-driving device, and a magnetic head contact control unit responsive to the detection of the rotation of the disc rotating-driving device by the rotation detection unit to bring the magnetic head into and out of contact with the disc.

With the disc driving apparatus according to the present invention, when the disc cartridge is inserted into the cartridge holder, the cartridge holder is moved towards the disc table of the disc rotating-driving device. It is by such movement of the cartridge holder towards the disc table that the magnetic disc within the disc cartridge is loaded on the disc table. When it is tried to load the magnetic disc on the disc table, and rotation of the disc rotating-driving device is detected by the rotation detection unit, the above mentioned magnetic head contact control unit is controlled by such detection so that the magnetic head is contacted with the magnetic disc loaded on the disc table. That is, with the present recording and/or reproducing apparatus for a disc, it is after detection of the rotation of the magnetic disc on the disc table that the magnetic head may be contacted with the magnetic disc.

DETAILED DESCRIPTION OF PREFERRED EMBODIMENTS

Figure 1:
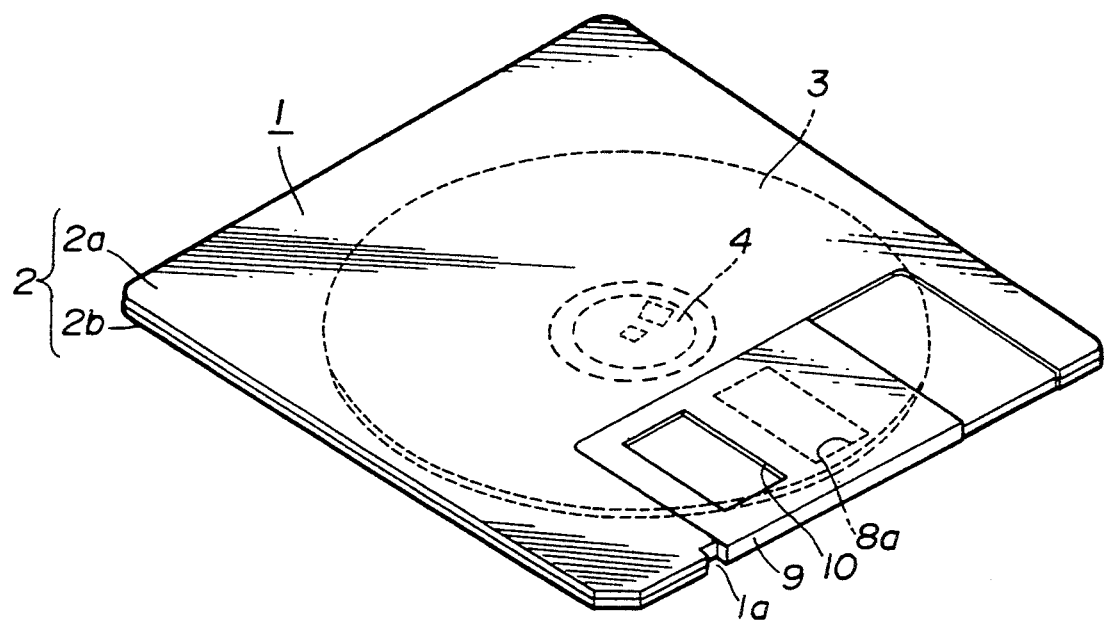
FIG. 1 is a perspective view of a disc cartridge to be loaded in the disc driving apparatus according to the present invention.
Figure 2:
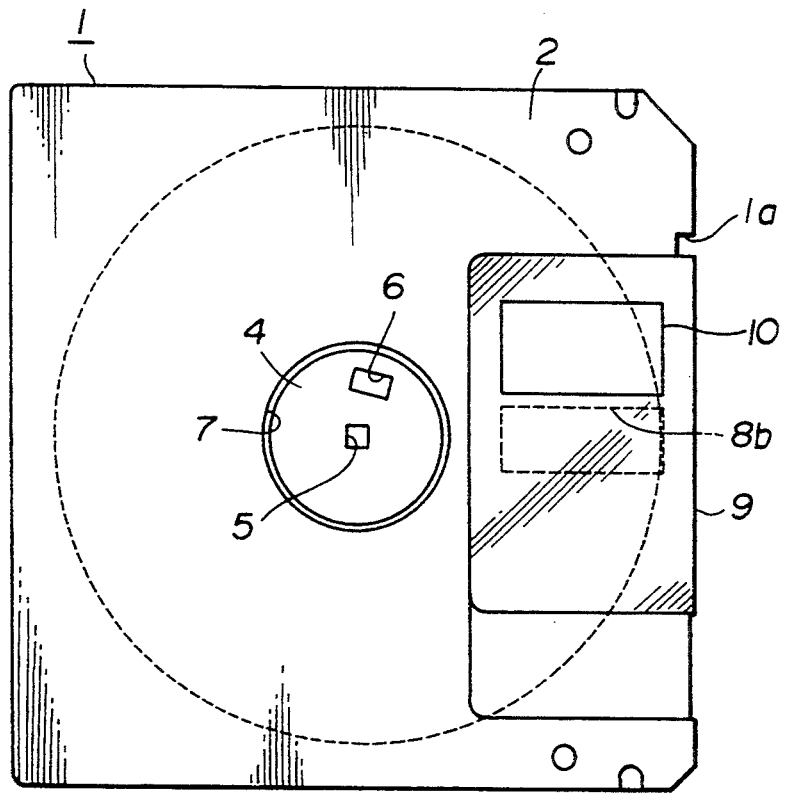
FIG. 2 is a bottom plan view of the disc cartridge.

By referring to the drawings, a preferred embodiment of the present invention will be explained in more detail.

Figure 3:
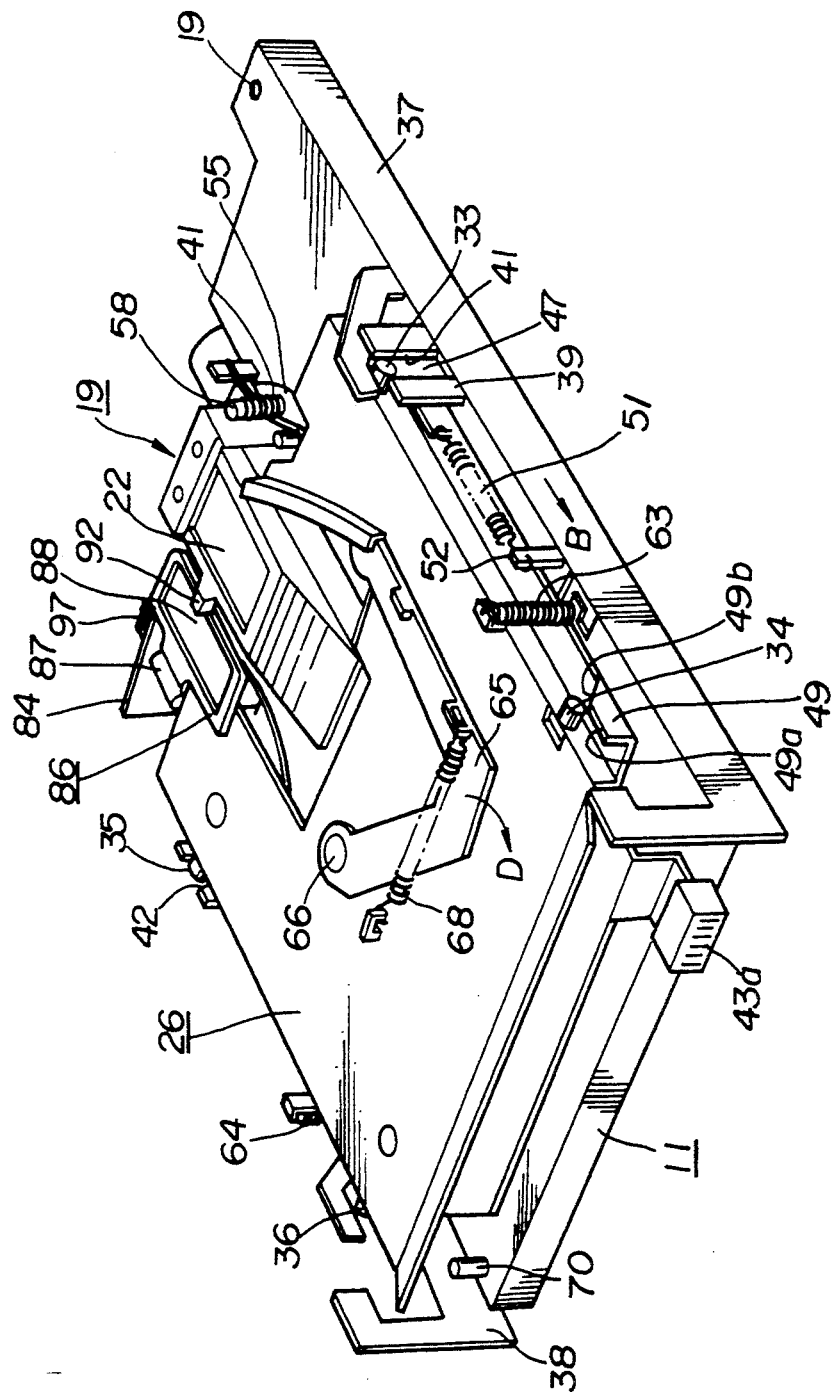
FIG. 3 is a perspective view of the disc driving apparatus according to the present invention.
Figure 4:
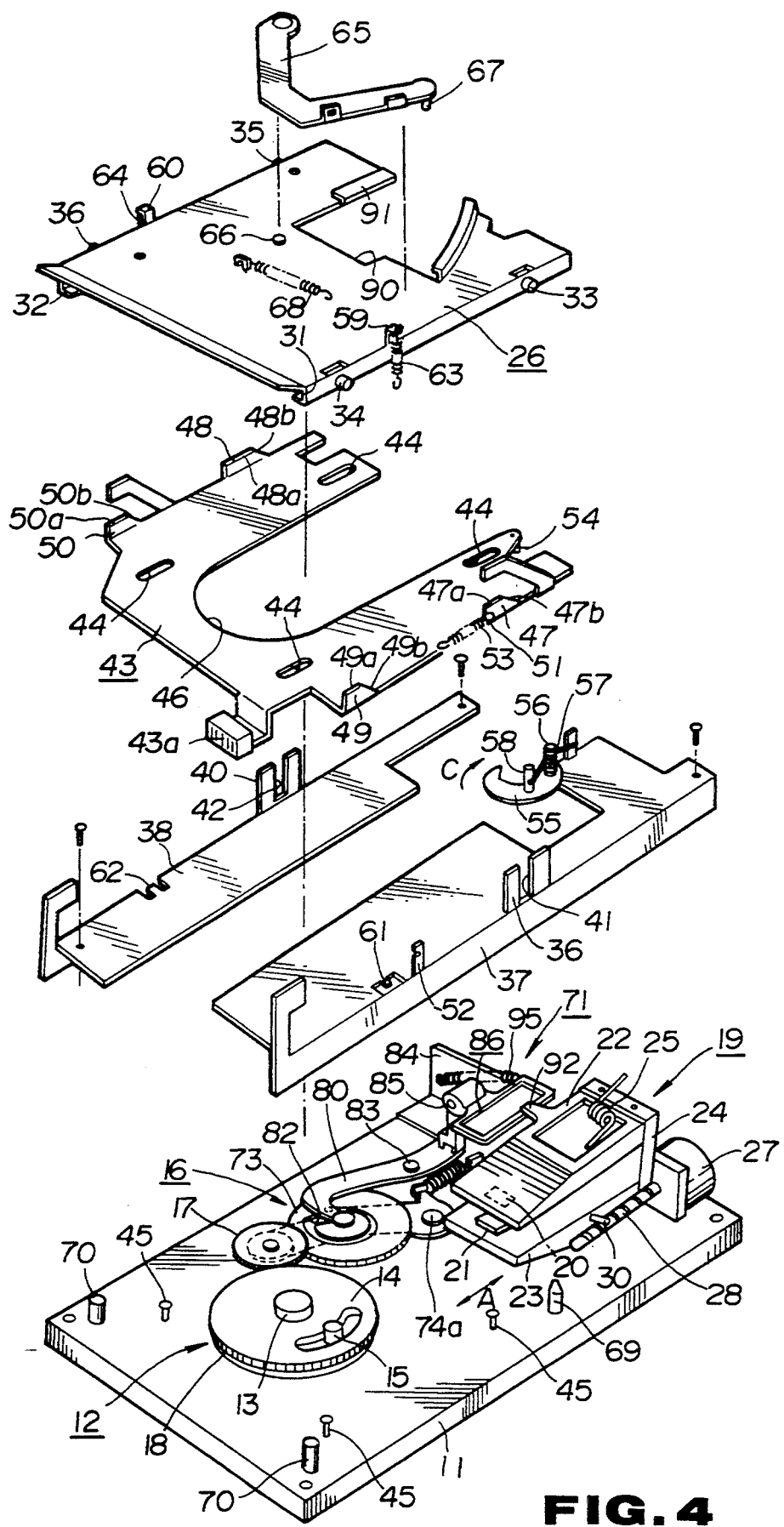
FIG. 4 is an exploded perspective view of the recording and/or reproducing apparatus for a disc.

Referring to FIGS. 3 and 4, a disc drive device according to the present invention includes a disc rotating-driving device 12 for rotationally driving a magnetic disc 3 in a disc cartridge 1 having cleaning liner therein by means of a mechanical chassis 11 constituting a main member of the disc drive device. This disc rotating device 12 includes a driving electric motor mounted on the lower surface of the chassis 11 with a driving shaft 13 projecting above the upper surface of the chassis 11. A disc table 14 mounting a magnetic disc 3 is mounted on the foremost part of the driving shaft 13 for rotation in unison therewith. The disc table 14 has, in addition to the drive shaft 13, a drive pin 15 offset from its center of rotation. This driving pin 15 is biased by biasing means, not shown, in a direction opposite to the rotational direction of the magnetic disc 3. The disc 3 is attached on the disc table 14 by having the driving shaft 13 inserted into a central opening 5 in a central disc-shaped member 4 and by having the driving pin 15 inserted into a driving pin engaging opening 6. The disc table 14 is rotated in this state so that the driving pin 15 biased by biasing means is brought into pressure contact with a positioning surface of the opening 6 for centering the disc 3 to assure rotation of the disc 3 in unison with the disc table 14. On the outer periphery of the disc table 14 is formed a disc gear 18 for separably meshing with rolling contact gear or counter gear 17 of a rotation detection unit 16 functioning as means for detecting the rotation of the disc table 14.

On the chassis 11 is mounted a magnetic head unit 19 in opposition to a disc table 14 of the disc rotating-driving device 12. The magnetic head unit 19 is provided with a first magnetic head 20 facing the upper surface of the magnetic disc 3 loaded on the disc table 14 and a second magnetic head 21 facing the lower surface of the magnetic disc 3. These magnetic heads 20, 21 are mounted by means of first and second head supporting arms 22, 23. The first head supporting arm 22 is rotatably mounted by means of a mounting base 24 so that the first magnetic head 21 attached to its distal end may be engaged with or disengaged from the magnetic disc 3 mounted on the disc table 14. The first head supporting arm 22 is rotationally biased by biasing means, such as a torsion coil spring 25, towards the magnetic disc 3 mounted on the disc table 14. The magnetic head device 19 is mounted by having an engaging pin 30 projecting from one side of the second head supporting arm 23 engaging with a feed screw 28 rotationally driven by a head feed motor 27 mounted on the chassis 11. With the head feed motor 27 driven into rotation and the feed screw in a 28 set into rotation, the magnetic head device 19 is fed direction shown by an arrow A in FIG. 4, which is the radial direction of the magnetic disc 3 mounted on the disc table 14.

On the chassis 11 is also mounted a cartridge holder 26 into which the disc cartridge 1 is introduced for overlying the disc table 14. The cartridge holder 26 is in the form of a plate having the same size as the disc cartridge 1 and is provided with cartridge support side sections 31, 32 for supporting both sides of the disc cartridge 1. These cartridge support sections 31, 32 are formed by bending both sides of the cartridge holder 26 into a sectional shape in the form of a letter U. Guide pins 33, 34; 35, 36 are formed on the lateral sides of the cartridge support sections 31, 32 of the cartridge holder 26. The cartridge holder 26 is supported with guide pins 33, 35 disposed on the inner sides opposite the inserting direction of the disc cartridge 1 engaging in guide grooves 41, 42 formed in guide sections 39, 40 on side plates 37, 38 of the chassis 11. These guide grooves 41, 42 are engaged by guide pins 33, 35 to permit the cartridge holder 26 to be guide by the guide grooves 41, 42 so as to be raised or lowered along the direction of the rotational axis of the disc rotating device 12.

Such vertical movement of the cartridge holder 26 is brought about by the sliding motion of an ejection plate 43 provided between the cartridge holder 26 and the chassis 11. This ejection plate 43 is mounted on the chassis with slide guide openings 44 engaged by slide guide pins 45 on the chassis 11 so that the ejection plate may be slid within the extent of the slide guide openings 44. This ejection plate 43 has a reentrant portion 46 extending from its rear towards its front for exposing the corresponding portion of the disc table 14 of the disc rotating device 12. On both sides of the ejection plate 43 are formed upright cam plates 47, 48; 49, 50 for supporting the cartridge holder 26 in the raised position during ejection and insertion of the disc cartridge 1 and for raising the cartridge holder 26. These cam plates 47, 48; 49, 50 are formed so as to be in register with guide pins 33, 34; 35, 36 provided on the cartridge holder 26 provided on the ejection plate 43. The cam plates 47, 48; 49, 50 are constituted by horizontal surfaces 47a, 48a; 49a, 50a for supporting the cartridge holder 26 in the raised position and inclined cam surfaces 47b, 48b; 49b, 50b for raising or lowering the cartridge holder 26. The cartridge holder 26 is mounted on the ejection plate 43 with the guide pins 33, 34; 35, 36 resting on the associated cam plates 47, 48; 49, 50.

Meanwhile, this ejection plate 43 is biased by a tension spring 53 mounted between a spring retainer 51 on one side of the ejection plate 43 and a spring retainer 52 on one side plate 37 in a direction shown by an arrow B in FIG. 3. That is, the ejection plate 43 is biased in a direction in which the guide pins 33, 34; 35, 36 on the cartridge holder 26 will be in register with the inclined cam surfaces 47b, 48b; 49b, 50b of the cam plates 47, 48; 49, 50. A locking pin 54 is formed for extending downwards from the lower rear surface of the ejection plate 43. When the ejection plate 43 is at the eject position, that is when the guide pins 33, 34; 35, 36 are positioned above the horizontal sections 47a, 48a; 49a, 50a of the cam plates 47, 48; 49, 50, the cartridge holder being in its raised position, the locking pin 54 is engaged with a locking lever 55 pivotally mounted on the side plate 37 for locking the ejection plate 43 in its eject position against the bias of the tension spring 53.

The locking lever 55 is supported by a shaft 56 on the side plate 37 and is rotationally biased by a torsion coil spring 57 placed about shaft 56 in a direction shown by an arrow C in FIG. 4. An unlocking pin 58 is mounted halfway on the locking lever 55 and is thrust by one end of the disc cartridge 1 inserted into the cartridge holder 26 to cause partial rotation of the locking lever 55 against the bias of torsion coil spring 57 for disengaging the locking lever 55 from the locking pin 54. Thus, in the ejection state in which the ejection plate 43 is slid in a direction opposite to the direction shown by arrow B in FIG. 3 against the bias of the torsion spring 53 by actuating a thrust button 43a, with the disc cartridge 1 remaining uninserted into cartridge holder 26, the cartridge holder 26 is maintained in its raised position, as shown in FIG. 3, to permit the disc cartridge 1 to be introduced into the cartridge holder 26.

The disc holder 26 is thrust and biased towards the ejection plate 43 by springs 63, 64 mounted between spring retainers 59, 60 provided on its both sides and spring retainers 63, 64 mounted between spring retainers 61, 62 provided on the side plate 37, 38.

When the disc cartridge 1 is inserted into the cartridge holder 26, with the ejection plate 43 in the eject position and with the cartridge holder 26 in the raised position as shown in FIG. 3, the unlocking pin 58 is thrust by one end of the disc cartridge 1, so that the locking lever 55 is rotated in the direction opposite to the direction shown by arrow C in FIG. 4, against the bias of the torsion coil spring 57. By such rotation, the locking lever 55 is disengaged from the locking pin 54, so that the ejection plate 43 is moved in the direction shown by an arrow B in FIG. 3, under the bias of the tension spring 53. When the ejection plate 43 is moved in the direction shown by arrow B in FIG. 3, the cartridge holder 26 is lowered towards the chassis 1, by the movement of guide pins 33, 34; 35, 36 along the inclined cam surfaces 47b, 48b; 49b, 50b of the cam plates 47, 48;

49, 50, for loading the magnetic disc 3 in the disc cartridge 1 on the disc table 14.

On the cartridge holder 26 is mounted a shutter opening and closing lever 65 for shifting the shutter 9 of the disc cartridge 1 in conjunction with the insertion of the disc cartridge 1 for opening the head inserting openings 8a, 8b. This shutter opening and closing lever 65 is in the shape of a letter U and is mounted rotatably by having its proximal end supported by a pivot pin 66 which is formed on the upper surface of the cartridge holder 26. On the lower surface of the distal end of the shutter opening and closing lever 65 is mounted a shutter actuating pin 67 which is protruded towards the lower surface of the cartridge holder 26 so as to be engaged with a retention step 1a on one end of the disc cartridge 1 into abutment with one side of the shutter 9. This shutter opening and closing lever 65 is rotationally biased in a direction shown by an arrow D in FIG. 3 by a spring 68 having its one end retained by cartridge holder 26. That is, when the disc cartridge 1 is introduced into cartridge holder 26, the shutter opening and closing lever 65 is rotated against the bias of spring 68 in a direction of opening the shutter 9.

On the chassis 11 are also mounted a height level setting pin 70 and a position setting pin 69 for setting the loading position of the disc cartridge 1 on the disc table 14.

With the recording/reproducing apparatus of the present invention, a rotation detection unit 16 is provided for detecting the rotation of the disc rotating device 12 and controlling a control unit 71 adapted for bringing the first magnetic head 20 into and out of contact with the magnetic disc 3 loaded on the disc table 14 in dependence upon the detection output.

The rotation detection unit 16 for detecting the rotation of the disc rotating device 12 is constituted by a counter gear 17 which may be brought into or out of meshing with disc gear 18 formed on the outer periphery of the disc table 14, a cam gear 73 meshing with a connection gear formed coaxially and integrally with the gear 17, and a rotary arm 74 mounting the gears 17, 73. The gear 17 is rotatably supported by a shaft 75 provided on the distal end of the rotary arm 74, while the cam gear 73 is rotatably supported by a supporting shaft 76 formed halfway on the rotary arm 74 so that the cam gear 73 meshes with the connection gear 72. The rotary arm 74, mounting the gears 17 and 73, is mounted for rotation in the direction shown by arrow E and F in FIG. 5, by having its proximal end supported by a supporting shaft 74a on the chassis 11, so that the gear 17 may be engaged with or disengaged from disc gear 18. The rotary arm is rotationally biased by a tension spring 79 mounted between a spring retainer 77 on one proximal side and a spring retainer 78 on the chassis 11 in a direction shown by an arrow F in FIG. 5 in which the distal side gear 17 is moved away from the disc gear 18.

On the upper major surface of the cam gear 73 is formed a cam groove 82 engaged by an engaging pin 81 mounted on one end of a connection lever 80 adapted for controlling the control unit 71 under the force of rotation of the disc gear 18 which is transmitted from gear 17. When the cam gear 73 is rotated and the engaging pin 81 is moved along the cam groove 82, the cam groove 82 causes the connection lever 80 to be rotated to control the unit 71.

The connection lever 80 is mounted for rotation about a supporting shaft 83 mounted on the chassis 11 by having its central part pivotally supported by the supporting shaft 83.

The control unit 71 is provided with a magnetic head rotation control member 86 mounted for rotation by means of a supporting shaft 85 mounted at right angles with a mounting piece 84 formed on the chassis 11, as shown in FIG. 3. The control member 86 comprises a pivot section 87 for the supporting shaft 85, a magnetic head control arm 88 and a connecting lever engaging arm 89. The control member 86 is mounted for rotation about the supporting shaft 85 as the center of rotation by having the pivot section 87 fulcrumed by the supporting shaft 85. The control arm 88 is placed on a rest section 91 formed on one side of a U-shaped opening 90 provided at the rear side of the cartridge holder 26 for evading the magnetic head unit 19 as shown in FIG. 4. On the control arm 88 rests an engaging lug 92 projecting on one side of first head supporting arm 22 supporting the first magnetic head 20 of the magnetic head unit 19. Thus the first head supporting arm 22 mounted with a rotational bias towards magnetic disc 3 is brought into abutment with the magnetic head control arm 88 so as to be moved to follow the movement of the control arm 88. A connecting lever engaging arm 89 of the control member 86 is connected to the connecting lever 80 by having its distal side engaging recess 93 engaged by an engaging lug 94 provided at the other end of the connecting lever 80.

Figure 5:
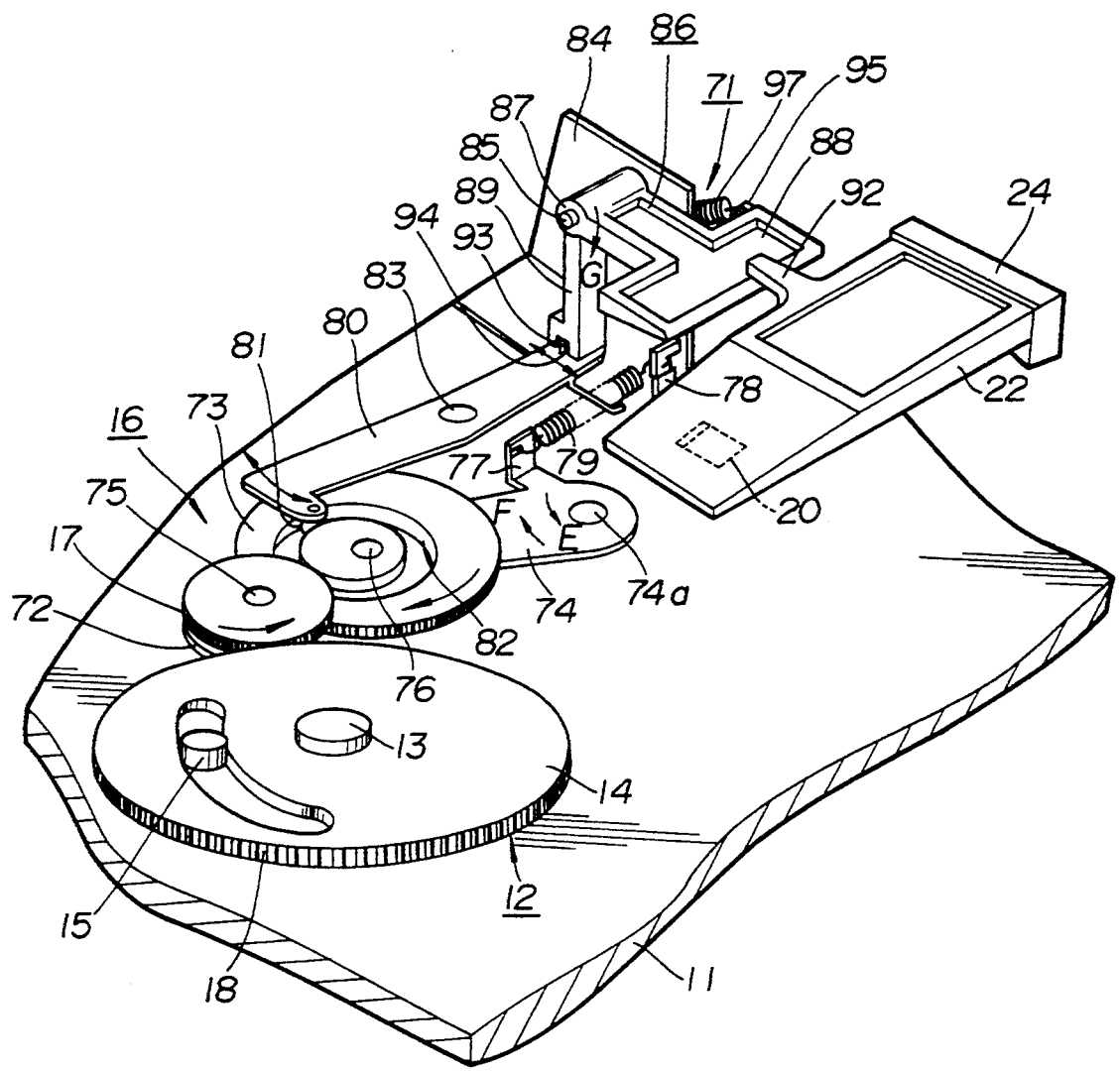
FIG. 5 is a perspective view showing the rotation detection unit and the magnetic head contact control unit constituting the recording and/or reproducing apparatus for a disc according to the present invention.

The magnetic head rotation control member 86, which is mounted by having the magnetic head control arm 88 resting on the rest piece 91 at the rear side of the cartridge holder 26 and by having the connecting lever engaging arm 89 connected to the connecting lever 80, is rotationally biased in a direction shown by an arrow G in FIG. 5, that is in a direction in which the control arm 88 abuts on the rest piece 91 at the rear end of the cartridge holder 26, by a tension spring 97 mounted between a spring retainer 95 on one side of the control arm 88 and a spring retainer 96 provided on the mounting piece 84.

With the above described recording/reproducing apparatus, when the ejection plate 43 is slid by actuation of thrust button 43a in the direction opposite to the direction shown by an arrow B in FIG. 3 against the bias of the spring 53, and when the disc cartridge 1 is as yet not introduced into the cartridge holder 26, the cartridge holder 26 is maintained at a raised position in which, as shown in FIGS. 6A and 6B, the guide pins 33, 34; 35, 36 are positioned on horizontal surfaces 47a, 48a; 49a, 50a of cam plates 47, 48; 49, 50 to permit the insertion of disc cartridge 1. With the cartridge holder 26 in its raised position, the magnetic head rotation control member 86 is rotated, with its magnetic head control arm 88 resting on the rest piece 91 of the cartridge holder 26, against the tension spring 97, in a direction opposite to the direction shown by arrow G in FIG. 5. Simultaneously, the first head supporting arm 22, having its engaging lug 92 resting on the magnetic head control arm 88, is rotated under the bias of the torsion coil spring 25, so that the first magnetic head 20, supported by the first head supporting arm 22, is spaced apart from magnetic disc 3 loaded on the disc table 14, as shown in FIG. 6B.

With the magnetic head rotation control member 86 has been rotated in the direction opposite to the direction of arrow G in FIG. 5 against the bias of the tension spring 97, the connecting lever 80, which has been connected by having the lug 94 engaged in the recess 93 of the convecting lever engaging arm 89, is rotated in the direction shown by an arrow H in FIG. 6A, with the supporting shaft 83 as the center of rotation. As a result, the connecting lever 80, which has the engaging pin 81 engaging in cam groove 82 of cam gear 73, is fed from the thrusting force thrusting the rotary arm 74 supporting the cam gear 73 against the bias of the tension spring 79. The rotary arm 74, constituting the rotation detection unit 16, is rotated, under the bias of the tension spring 79, with the supporting shaft 74a as the center of rotation, in a direction shown by un arrow F in FIG. 6A, so that the counter gear 17 is paced apart from disc gear 18. At this time, the engaging pin 81 at one end of the connecting lever 80 is maintained in the state in which it is engaged in an initial position setting recess 82a on the outer periphery of the cam groove 82.

It is noted that the rotational position of the connecting lever 80 in the direction shown by an arrow F in FIG. 6A is controlled by a rotational position control member, such as a stop pin, provided on the chassis.

Figure 7A:
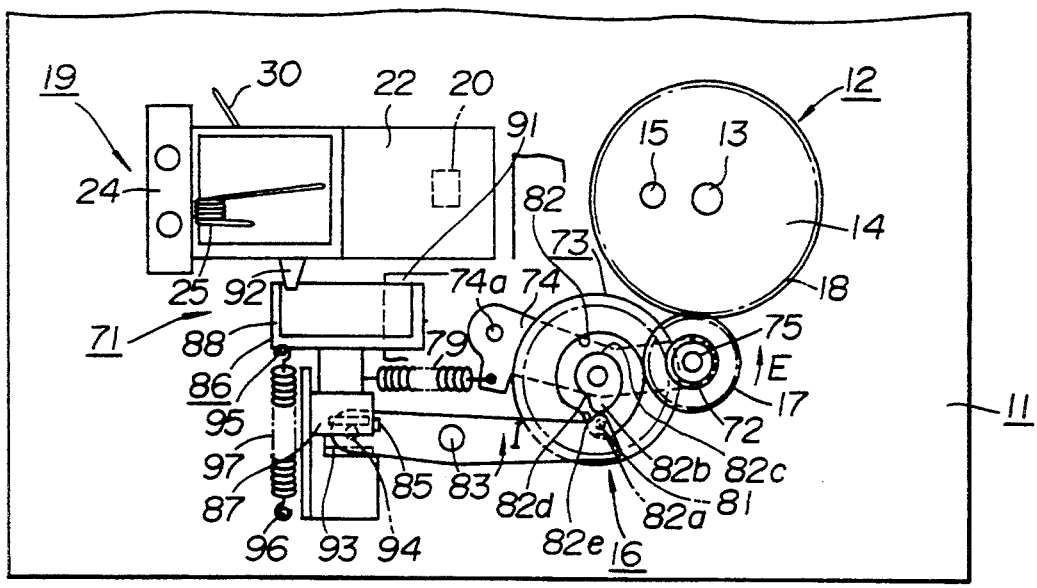
FIG. 7A is a plan view showing essential parts of the rotation detection unit and the magnetic head contact control unit with the rolling contact gear contacted with the disc gear.
Figure 7B:
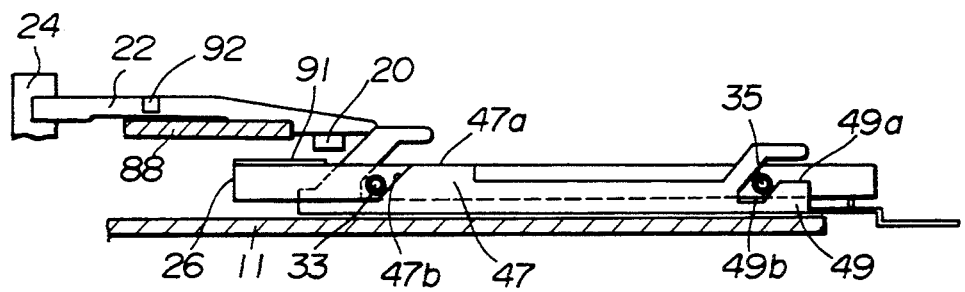
FIG. 7B is the side elevational view of FIG. 7A.

In the above described ejection position shown in FIG. 3, in which the cartridge holder 26 is raised and spaced apart from the disc table 14, when the disc cartridge 1 is inserted into the cartridge holder 26, the locking pin 54 provided on the ejection plate 43 is disengaged from the locking lever 55, and the ejection plate 43 is moved from the bias of the tension spring 53 in the direction shown by an arrow B in FIG. 3. By the guide pins 33, 34; 35, 26 moving along inclined cam surfaces 47b, 48b; 49b, 50b of cam plates 47, 48; 49, 50, the cartridge holder 26 is lowered towards the chassis 11, as shown in FIG. 7B.

Figure 6:
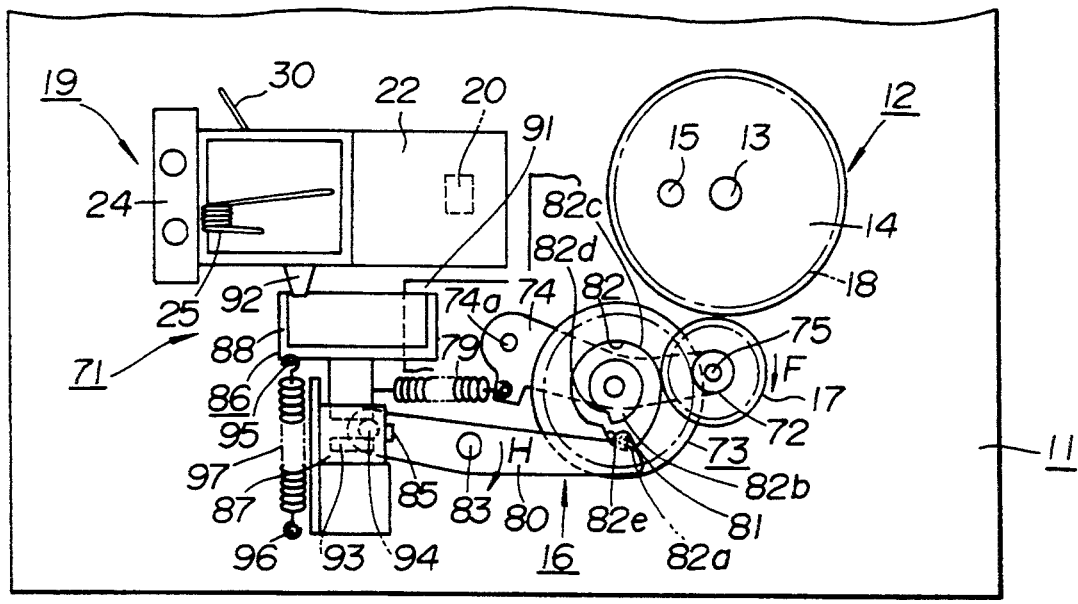
FIG. 6A is a plan view showing essential parts of the rotation detection unit and the magnetic head contact control unit in the initialized state.
FIG. 6B is a side elevational view of FIG. 6A.
Figure 6:
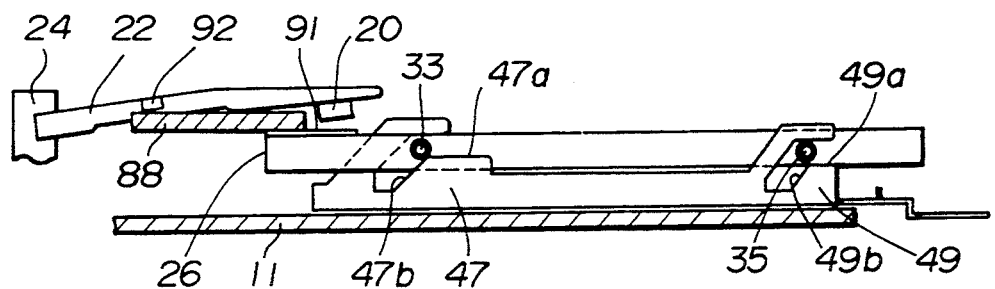

When the cartridge holder 26 is lowered towards chassis 11, the rest piece 91 supporting the magnetic head control arm 88 is also lowered, so that the magnetic head rotation control member 86 is rotated in the direction shown by an arrow G in FIG. 6, under the bias of the tension spring 97. When the magnetic head rotation control member 86 is rotated under the bias of tension spring 97, the connecting lever 80 is rotated in the direction of an arrow I in FIG. 7A for shifting the engaging pin 81 towards the inner periphery of the cam groove 82 to thrust the rotary arm 74 supporting the cam gear 73 against the bias of the tension spring 97 to engage the counter gear 17 with the disc gear 18 to enable the rotational driving force of the disc rotating device 12 to be transmitted to cam gear 73.

Meanwhile, when the engaging pin 81 is moved from the initial position setting recess 82a towards the inner periphery of cam groove 82, it abuts on and engages with an uppermost cam surface 82b of the inner peripheral cam surface formed in opposition to the recess 82a. With the engaging pin 81 engaging with the uppermost cam surface 82b, the rotation of the connecting lever 80 in the direction shown by an arrow I in FIG. 7A is restricted, while the rotation of the magnetic head rotation control member 86 under the bias of the tension spring 97 is also restricted. Thus the rotation of the magnetic head rotation control member 86 to follow the downward movement of the cartridge holder 26 is restricted, so that, as shown in FIG. 7B, the control arm 88 is spaced apart from the rest piece 91 of the cartridge holder 26. The rotation of the first head supporting arm 22 supporting the first magnetic head 20 under the bias of the torsion coil spring 25 is also restricted, so that the first magnetic head 20 is spaced apart from the magnetic disc 3 on the disc table 14, as shown in FIG. 7B.

When the cartridge holder 26 carrying the disc cartridge 1 therein is lowered as shown in FIG. 7A, and the disc cartridge 1 is positioned on the positioning pin 69 and the height level setting pin 70, at the same time that the magnetic disc 3 is loaded on disc table 14, the loading of the disc cartridge 1 is detected by a detection switch, not shown, provided on the chassis 11, and the rotational driving of the disc rotating-driving device 12 is started.

Figure 8A:
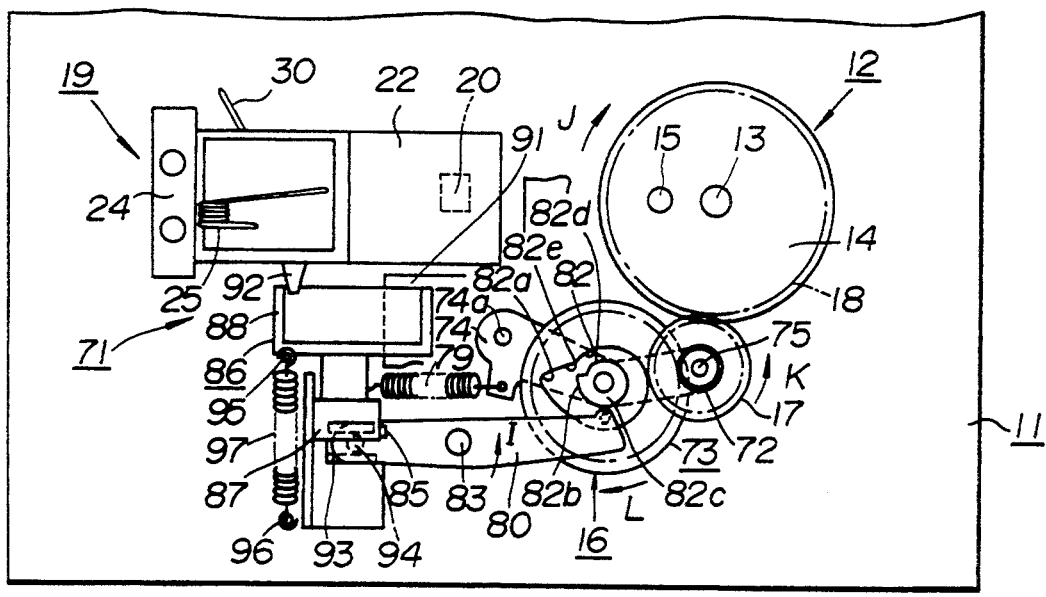
FIG. 8A is a plan view showing essential portions of the rotation detection unit and the magnetic head contact control unit with the magnetic head about to be contacted with the magnetic disc.

Upon initiation of the rotation of the disc rotating device 12, the disc table 14 is rotated in the direction shown by arrow J in FIG. 8A, so that the counter gear 17 meshing with the disc gear 18 formed on the outer periphery of the disc table 14 is rotated in the direction shown by an arrow K in FIG. 8A, at the same time that the cam gear 73 is rotated in the direction shown by arrow L in FIG. 8A. When the cam gear 73 is rotated in the direction shown by arrow L in FIG. 8A, the engaging pin 81 on the connection lever 80 in pressure contact with the inner peripheral cam surface of the cam groove 82 is moved to follow the inner peripheral cam surface. Since the engaging pin guide cam surface 82c guiding the engaging pin 81 has its radius decreased gradually from the uppermost cam surface 82b towards the center of the cam gear 73, the connection lever 80 is further moved in the direction shown by arrow I in FIG. 8A as the engaging pin 81 is moved along the engaging pin guide cam surface 82c.

Figure 8B:
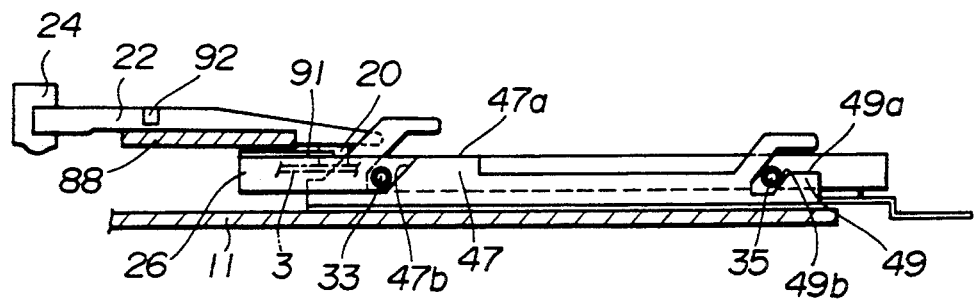
FIG. 8B is a side elevational view of FIG. 8A.

With such rotation of the connection lever 80, the magnetic head rotation control member 86 is rotated under the bias of tension spring 97, and the first head supporting arm 22 supporting the first magnetic head 20 is also rotated under the bias of the torsion coil spring 25 to follow the rotation of the magnetic head rotation control member 86 to bring the first magnetic head 20 into contact with the magnetic disc 3 on the disc table 14 as shown in FIG. 8B. The gear ratio between the gears 18 and 17 is so set that the disc table 14 performs approximately two revolutions, the magnetic disc 3 also perform approximately two revolutions.

It is noted that, with the first magnetic head 20 contacting the magnetic disc 3, the second magnetic head 21 also makes contact with the magnetic disc 3 which is thus sandwiched between the magnetic heads 20 and 21.

Figure 9A:
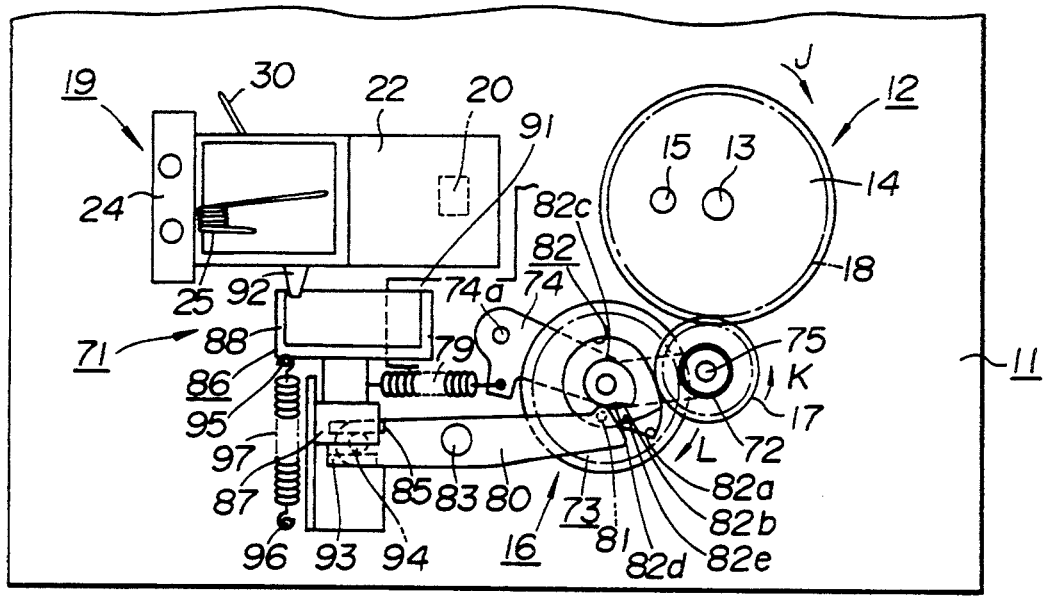
FIG. 9A is a plan view showing essential portions of the rotation detection unit and the magnetic head contact control unit with the magnetic head contacted with the magnetic disc.

After the first magnetic head 20 makes contact with the magnetic disc 3, cam gear 73 continues to be rotated in the direction shown by arrow L in FIG. 9A, the engaging pin 81 being further moved along the engaging pin guide cam surface 82c. When the engaging pin 81 causes the cam gear 73 to be rotated to the end of the engaging pin guide cam surface 82c as shown in FIG. 9A, the connection lever 80 is further rotated in the direction shown by arrow I in FIG. 9B, the magnetic head rotation control member 86 causing the rotation of the magnetic head controlling arm 88 until it abuts on the rest, piece 91 of the cartridge holder 26. The rotation of the connection lever 80 is restricted by restriction of the rotation of the magnetic head rotation control member 86.

Figure 9B:
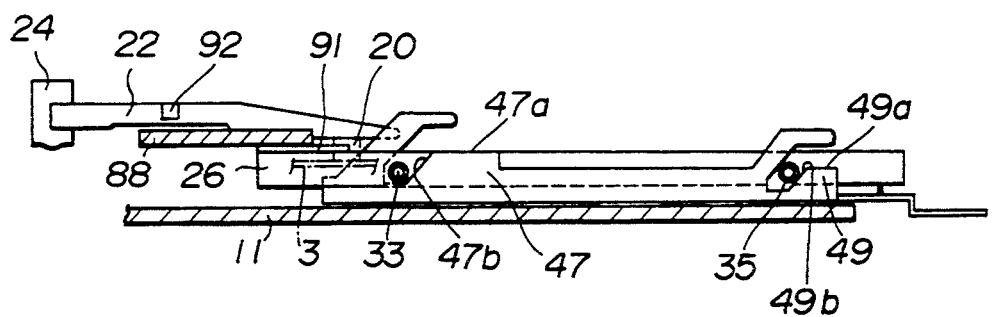
FIG. 9B is a side elevational view of FIG. 9A.
Figure 10:
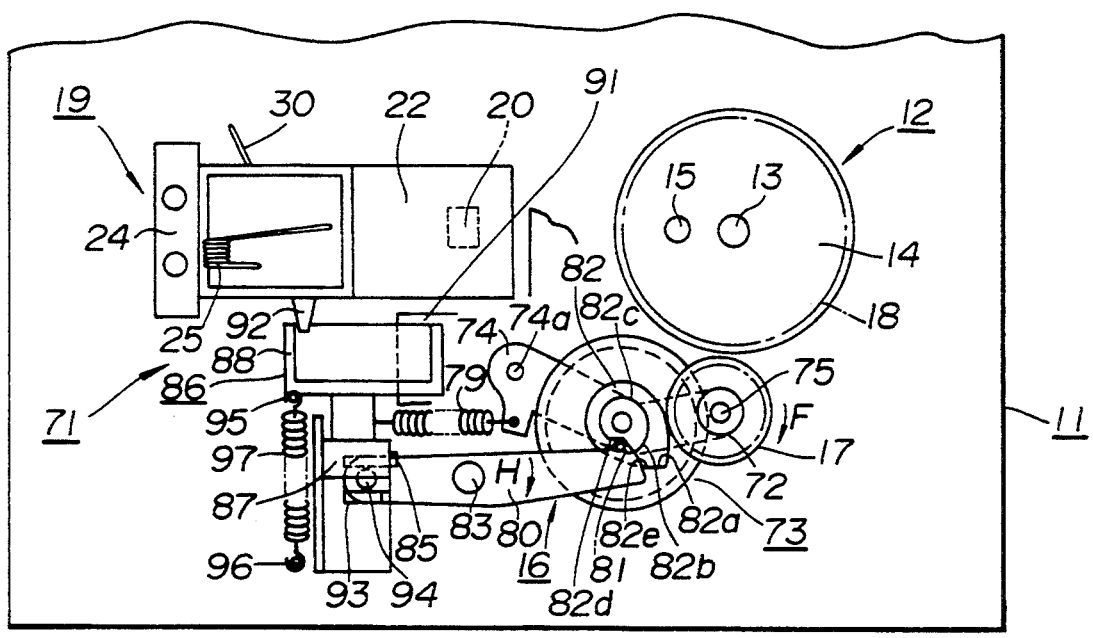
FIG. 10 is a plan view showing essential portions of the rotation detection unit and the magnetic head contact control unit with the rolling contact gear disengaged from the disc gear.

As long as the rotation of the magnetic head rotation control member 86 as shown in FIGS. 9A and 9B remains restricted, the gear 17 remains engaged with disc gear 18. When the gear 17 is further rotated under the rotational force of the disc table 14 to cause the rotation of the cam gear 73, the engaging pin 81 is engaged with the inner peripheral recess 82d, which is contiguous to the engaging pin guide cam surface 82c, as shown in FIG. 10, to release the thrusting force applied from the engaging pin 81 on the inner peripheral surface of the cam groove 82. The rotary arm 74 supporting the cam gear 73 is rotated in the direction shown by arrow F in FIG. 10, under the bias of tension spring 79, so that the counter gear 17 is separated from disc gear 18 to interrupt the transmission of the rotational driving force of the disc rotating device 12 to cam gear 73. Thus the disc table 14 is now enabled to rotate the magnetic disc 3 without being subjected to external loads.

When the recording or reproduction of data signals on or from the magnetic disc 3 is terminated and the ejection plate 43 is thrust for ejecting the disc cartridge 1 to bring the cartridge holder 26 to its raised position, the magnetic head rotation control member 86 is rotated against the bias of the tension spring 97, the connection lever 80 being also rotated in the direction as shown by an arrow H in FIG. 10. As a result, the engaging pin 81 provided on one end of the connection lever 80 is moved away from the inner peripheral recess 82d towards the initial position setting recess 82a so as to be returned to the initial position shown in FIG. 6A. At this time, the engaging pin 81 is guided by an engagement control guide surface 82e, which is contiguous to the initial position setting recess 82a on the outer periphery of the cam groove 82, so as to be positively engaged with the initial position setting recess 82a.

Figure 11:
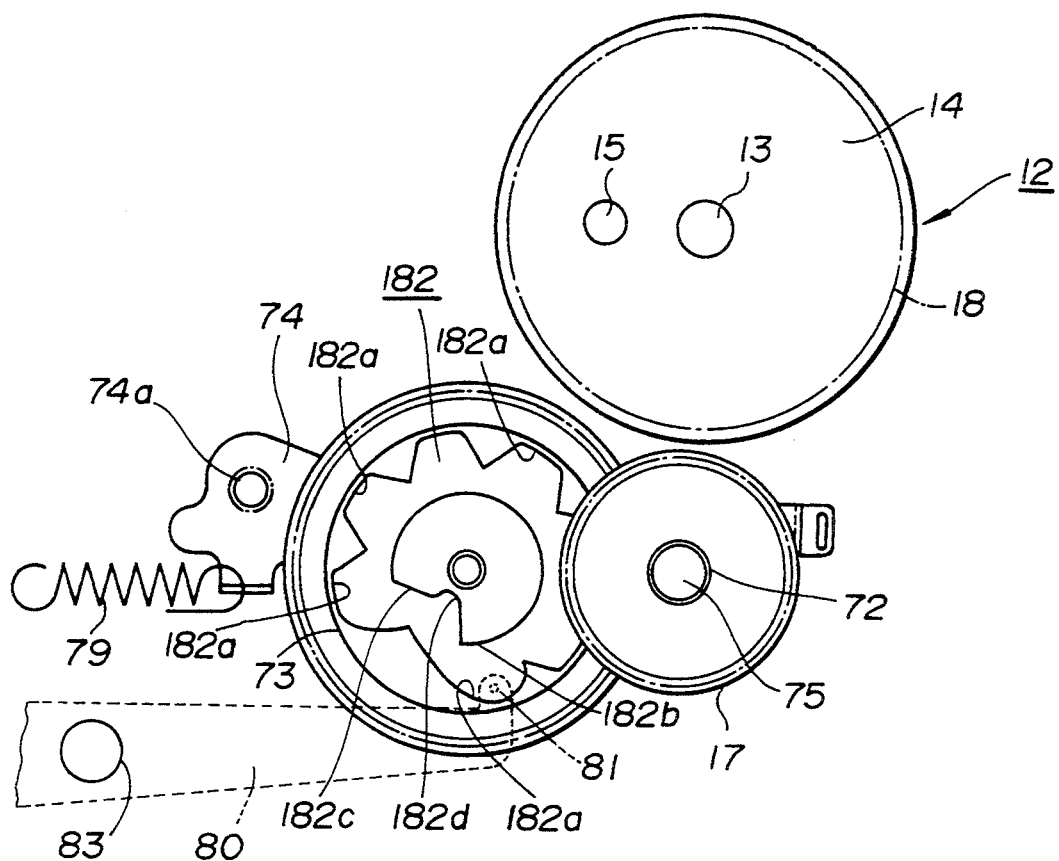
FIG. 11 is a plan view showing a modification of a cam gear.

Although only one initial position setting recess 82a formed in the cam groove 82 engaged by the engaging pin 81 provided in turn at one end of the connection lever 80 is formed so as to be contiguous to the engagement control guide surface 82e, a number of such recesses may also be provided, as shown in FIGS. 11 and 12.

By providing a large number of initial position setting recesses 182a along the entire periphery of the cam groove 182, as shown in FIG. 11, the engaging pin 81 may be engaged in one of the recesses 182a even if the ejecting operation is performed when the first head supporting arm 22 is about to be rotated so that the first magnetic head 20 will be contacted with the magnetic disc 3 on the disc table 14 in the state in which the disc table 14 is driven into rotation in the course of rotation of the cam gear 73.

By providing a large number of initial position setting recesses 82a in this manner, even if the ejecting operation is performed in the course of rotation of the cam gear 73, the engaging pin 81 is necessarily returned to the initial position, the connection lever 80 is turned as described previously in connection with FIG. 6A and the rotary arm 74 is maintained at a position in which the counter gear 17 has been rotated in a direction away from disc gear 18 under the bias of tension spring 79. When the disc cartridge 1 is again loaded in this state, the first head supporting arm 22 is rotated to bring the first magnetic head into contact with the magnetic disc after the driving of the disc table 14 has been performed by the same operation as that described in the preceding embodiment.

In this case, although a difference in the amount of rotation of the magnetic disc 3 until contact of the magnetic head 20 with the disc 3 is produced by the position of the initial position setting recess 182a engaged by the pin 81, at least the cleaning of the magnetic disc 3 is achieved by causing the magnetic head 20 to contact with the disc 3 after rotation of the magnetic disc 3.

Meanwhile, in the case of the cam groove 182 formed with a large number of the initial position setting recesses 182a, as shown in FIG. 11, the uppermost cam surface 182b is provided to cover the initial position setting recess 182a, in order to assure that, even in cases wherein the engaging pin 81 is engaged in one of the initial position setting recesses 182a, the engaging pin 81 is enabled to thrust the cam gear 73 formed with the cam groove 82. As shown in FIG. 12, the engaging pin guide cam surface 182c is formed as a flat surface in continuation to the end of the uppermost cam surface 182b, and an inner peripheral recess 182d is formed in continuation to the engagement pin guide cam surface 182c.

Although the recesses 182a may be formed on the overall periphery of the cam groove 82, it may be divided into plural sections, as shown in FIG. 12, so that the engaging pin 81 will be engaged in one of these recesses 182a to prevent untimely rotation of the cam gear 73 even if vibrations or the like disturbances are applied to the apparatus to assure positive thrusting by the engaging pin 81 on the uppermost cam surface 182b.

What is claimed is:

1. A disc apparatus into which is loaded a disc cartridge having a recording/reproducing disc accommodated therein and a head opening into which a recording/reproducing magnetic head is inserted, said disc apparatus comprising:
    rotational driving means including a disc table formed with a disc gear,
    cartridge shifting means movable between a disc cartridge inserting position and a loading position, said disc cartridge being loaded at said loading position onto said rotational driving means to perform a recording and/or reproducing operation,
    magnetic head shifting means for shifting said magnetic head between an operative position at which said magnetic head is drawn into contact with said disc and a retracted position at which said magnetic head is retracted out of contact with said disc,
    loading detection means for detecting the loading of said disc cartridge in said loading position to drive said rotational driving means, and
    control means including rotation detection means responsive to said rotational driving means, said rotation detection means including a gear train engageable with said disc gear and formed with a rotatable cam, a cam follower following said cam, and a mechanism driven by said cam follower for controlling said magnetic head shifting means so that, after said rotational driving means is driven into rotation for rotating said magnetic disc, said magnetic head is shifted to said operative position.

2. A disc apparatus into which is loaded a disc cartridge having a disc and a cleaning liner accommodated therein, said cleaning liner cleaning a surface of said disc by rotation of said disc, comprising:
    rotational driving means including a disc table formed with a disc gear,
    a cartridge holder into which said disc cartridge is inserted,
    holder lifting and lowering means for lifting and lowering said cartridge holder between an inserting position of inserting said disc cartridge into said cartridge holder and a loading position of loading said disc cartridge on said rotational driving means,
    loading detection means for detecting that said disc cartridge has been loaded on said rotational driving means to rotate said rotational driving means, and
    magnetic head shifting means including rotation detection means responsive to said rotational driving means, said rotation detection means including a gear train engageable with said disc gear and formed with a rotatable cam, a cam follower following said cam, and a mechanism driven by said cam follower for shifting a recording/reproducing head for recording and/or reproducing data on or from said disc towards said disc after rotational driving of said rotational driving means to rotate and clean said disc.

3. The disc apparatus according to claim 2 wherein said magnetic head shifting means includes magnetic head lifting and lowering means for lifting or lowering the magnetic head towards or away from said disc and control means for controlling the lowering of said magnetic head towards said disc by said magnetic head lifting and lowering means.

4. A disc apparatus according to claim 3 wherein said mechanism includes a connection lever pivotably mounted at an intermediate portion, carrying said cam follower at a first portion displaced from said intermediate portion, and engaging said magnetic head shifting means at a second portion displaced from said intermediate portion.

5. The disc apparatus according to claim 4 wherein said cartridge holder is lifted during ejection of said disc cartridge by said holder lifting and lowering means to said inserting position, said magnetic head lifting and lowering means being driven for separating said magnetic head away from said disc.

* * * * *